United States Patent
Holland et al.

(10) Patent No.: US 9,019,291 B2
(45) Date of Patent: Apr. 28, 2015

(54) MULTIPLE QUALITY OF SERVICE (QOS) THRESHOLDS OR CLOCK GATING THRESHOLDS BASED ON MEMORY STRESS LEVEL

(71) Applicant: Apple Inc., Cupertino, CA (US)

(72) Inventors: Peter F. Holland, Los Gatos, CA (US); Marc A. Schaub, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 210 days.

(21) Appl. No.: 13/775,641

(22) Filed: Feb. 25, 2013

(65) Prior Publication Data

US 2014/0240332 A1    Aug. 28, 2014

(51) Int. Cl.
*G09G 5/39*    (2006.01)
*G06T 1/60*    (2006.01)

(52) U.S. Cl.
CPC .................................... *G06T 1/60* (2013.01)

(58) Field of Classification Search
CPC .............. G06T 1/20; G06T 1/60; G09G 5/39
USPC ............................ 345/506, 530, 531; 711/100
See application file for complete search history.

(56) References Cited

U.S. PATENT DOCUMENTS

| | | | |
|---|---|---|---|
| 6,804,757 B2 | 10/2004 | Weber | |
| 7,114,086 B2 * | 9/2006 | Mizuyabu et al. | 713/320 |
| 7,243,041 B2 * | 7/2007 | Nalawadi et al. | 702/132 |
| 7,657,706 B2 | 2/2010 | Iyer et al. | |
| 7,692,642 B2 * | 4/2010 | Wyatt | 345/211 |
| 7,975,192 B2 | 7/2011 | Sommer et al. | |
| 8,125,490 B1 | 2/2012 | Vaidya et al. | |
| 8,314,807 B2 | 11/2012 | Biswas et al. | |
| 2009/0096797 A1 * | 4/2009 | Du et al. | 345/506 |
| 2011/0169849 A1 | 7/2011 | Bratt et al. | |
| 2012/0072679 A1 | 3/2012 | Biswas et al. | |
| 2012/0131306 A1 | 5/2012 | Bratt et al. | |

FOREIGN PATENT DOCUMENTS

CN            101419579            4/2009

OTHER PUBLICATIONS

David Andrew Roberts, "Efficient Data Center Architectures Using Non-Volatile Memory and Reliability Techniques", University of Michigan, 2011, pp. 1-170.
U.S. Appl. No. 13/744,637, filed Jan. 18, 2013, Peter F. Holland.

* cited by examiner

*Primary Examiner* — Jacinta M Crawford
(74) *Attorney, Agent, or Firm* — Meyertons, Hood, Kivlin, Kowert & Goetzel, P.C.; Lawrence J. Merkel (57) ABSTRACT

In an embodiment, a display control unit is configured to transmit read operations to the memory in the system to read image data for processing, and may employ QoS levels with the read operations to ensure that enough data is provided to satisfy the real time display requirements. To determine which QoS level to use for a given read request, the display control unit may be configured to compare an amount of image data in the display control unit (e.g. in various input and/or output buffers in the display control unit) to one or more thresholds. The display control unit may also be configured to dynamically update the thresholds based on a memory stress level in the memory controller.

20 Claims, 8 Drawing Sheets

MULTIPLE QUALITY OF SERVICE (QOS) THRESHOLDS OR CLOCK GATING THRESHOLDS BASED ON MEMORY STRESS LEVEL

BACKGROUND

1. Field of the Invention

This invention is related to the field of digital systems and, more particularly, to handling quality of service (QoS) issues in memory accesses generated within the system.

2. Description of the Related Art

Most digital systems include a variety of devices that need access to memory (e.g. processors, peripherals, etc.). For example, a processor accesses memory to read instructions for execution, to read and write data during execution of the instructions, etc. Various devices read and write data as well. For example, video/graphics devices write data representing images to be displayed, read data for display, etc. A network device reads and writes packet data to/from memory. A mass storage device writes stored data being transferred to memory, or reads memory data being transferred to the mass storage device.

With numerous devices potentially accessing memory, a mechanism is needed for selecting among read and write operations from various devices, ordering the operations from different devices, etc. The mechanism needs to balance performance requirements of the devices (which differ, depending on the type of device) as well as providing good memory performance (e.g. grouping operations to the same page of memory to improve memory bandwidth utilization and reduce average power consumption, etc.).

Some devices are categorized as real-time devices. These devices are characterized by a need to receive data at a certain rate in real time, or erroneous operation may occur. For example, video data needs to be provided within the frame rate of the video, or visual artifacts may occur on the display. Similarly, audio devices are real time: if the audio data is not available at the audio rate, skips in the audio playback may occur. Other devices are non-real time, such as processors. Non-real time devices can perform better if data is provided more rapidly, but will not have erroneous operation if data is not provided as rapidly.

One mechanism that can be used to balance the requirements of real time and non-real time device is QoS. The real time device can be provided with several levels of QoS, with increasing levels of priority. As the need for data becomes more critical to prevent erroneous operation, the device can issue memory operations with higher levels of QoS. The memory controller can respond more rapidly to the higher QoS memory operations, preventing the erroneous operation that might otherwise occur. The non-real time deices can also be provided with QoS levels to rank against the real time QoS levels.

There are costs for issuing the higher QoS memory operations, at the system level. The memory controller may bypass other memory operations that might be more efficiently performed together (e.g. memory operations that are to an already-open page in the memory). Accordingly, overall system performance can suffer if the QoS levels of real time memory operations are increased too frequently. Because erroneous operation occurs for real time devices if their data needs are not met, the determination of which QoS level to use for a given memory operation is made conservatively (i.e. assuming a worst case scenario in terms of memory load from other devices in the system). While such determinations can ensure the correct operation of the real time devices, the increase in QoS levels can occur more frequently then necessary if the worst case scenario is not in effect, reducing memory bandwidth utilization and increasing power consumption in the memory unnecessarily.

SUMMARY

In an embodiment, a display control unit includes circuitry configured to process image data (e.g. still frames and/or video sequences) for visual display. The display control unit may be configured to blend one or more still frames and/or sequences to produce output frames. The display control unit may be configured to transmit read operations to the memory in the system (e.g. to a memory controller that controls the memory) to read the image data from memory for processing, and may employ QoS levels with the read operations to ensure that enough data is provided to satisfy the real time display requirements. To determine which QoS level to use for a given read request, the display control unit may be configured to compare an amount of image data in the display control unit (e.g. in various input and/or output buffers in the display control unit) to one or more thresholds. The display control unit may also be configured to dynamically update the thresholds based on a memory stress level in the memory controller. The memory stress level may measure a "busyness" of the memory controller, which may indicate the effect that external factors such as memory operations from other devices in the system may have on the ability of the memory controller to service the display control unit's read operations. When the stress level is high (the memory controller is busy), conservative thresholds may be used. When the stress level is low (the memory controller is less busy), less conservative thresholds may be used since the memory is not in a worst-case situation and is therefore more likely to provide data in a timely fashion.

In an embodiment, using less conservative thresholds when the system/memory controller is lightly loaded may decrease the frequency at which higher QoS levels are generated by the display control unit. Since the higher QoS levels are not necessary in such situations, the display control unit may operate correctly while not reducing performance/increasing power consumption in the memory system. When heavier loads are detected, the more conservative thresholds based on worst-case conditions may be employed to ensure proper operation.

While the display control unit is used as an example embodiment for the mechanisms describe herein, other devices that employ QoS may implement similar mechanisms. For example, other real time devices may implement similar mechanisms.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Figure 1:
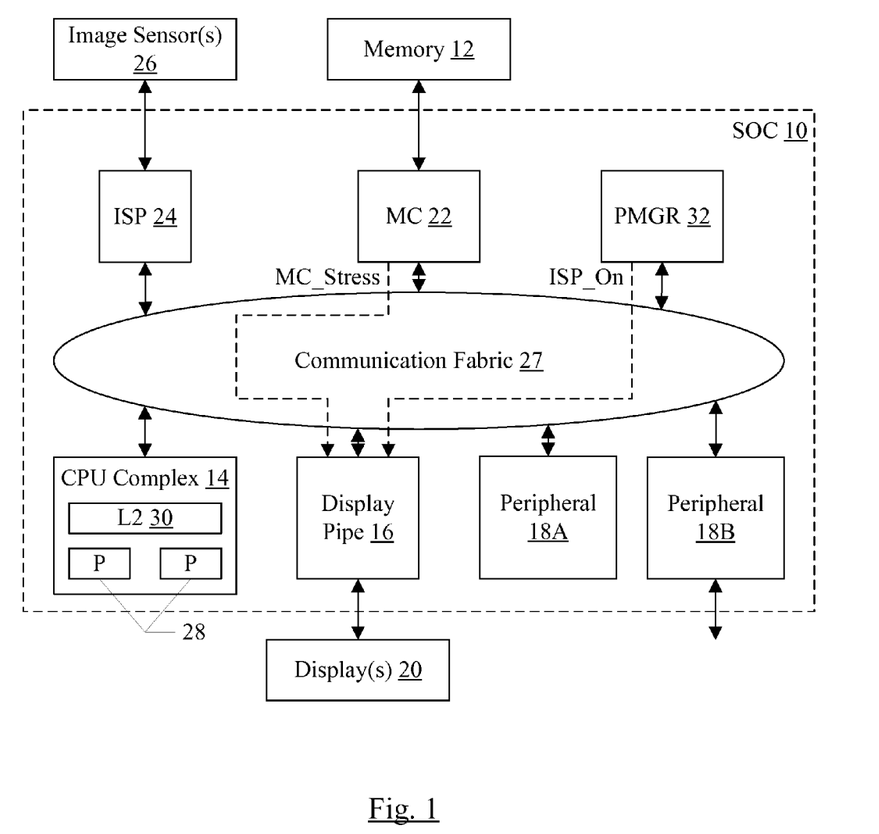
FIG. 1 is a block diagram of one embodiment of a system on a chip (SoC).

Turning now to FIG. 1, a block diagram of one embodiment of an SOC 10 is shown coupled to a memory 12, one or more image sensors 26, and one or more displays 20. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, an image signal processor (ISP) 24, a power manager (PMGR) 32, and a communication fabric 27. The components 14, 16, 18A-18B, 22, 24, and 32 may all be coupled to the communication fabric 27. The memory controller 22 may be coupled to the memory 12 during use. Similarly, the ISP 24 may be coupled to the image sensors 26 during use and the display pipe 16 may be coupled to the displays 20 during use. In the illustrated embodiment, the CPU complex 14 includes one or more processors 28 and a level two (L2) cache 30. In some embodiments, the memory controller 22 may be coupled to provide a memory stress indication to the display pipe 16 (MC_Stress in FIG. 1). In some embodiments, the PMGR 32 may be configured to provide an ISP_On indication to the display pipe 16. In some embodiments, both the MC_Stress and the ISP_On indications may be provided.

The display pipe 16 may include hardware to process one or more static frames and/or one or more video sequences for display on the displays 20. Generally, for each source frame or video sequence, display pipe 16 may be configured to generate read memory operations to read the data representing the frame/video sequence from the memory 12 through the memory controller 22. Each read operation may include a QoS parameter that specifies the requested QoS level for the operation. The QoS level may be managed to ensure that the display pipe 16 is provided with data in time to continue displaying images without visual artifacts (e.g. incorrect pixels being displayed, "skipping", or other visually-identifiable incorrect operation). An initial QoS level may be used normally (e.g. a lowest level, in terms of priority). The QoS level may be increased as the potential to have erroneous operation due to running out of data increases. In an embodiment, the QoS level may be determined based on the amount of data that the display pipe 16 has available. For example, the display pipe 16 may include various input and/or output buffers to store image data, and the amount of data available may include the data stored in the buffers.

Particularly, the display pipe 16 may include one or more thresholds for comparison to the data in the buffers, and may select between the QoS levels based on the thresholds. That is, as the amount of data available falls below respective thresholds, the QoS levels may be increased. In an embodiment, there may be a threshold for each transition between QoS levels (e.g. there may be one fewer thresholds than there are QoS levels). In some embodiments, there may be two thresholds per transition to permit hysteresis in the transitions. The hysteresis may help avoid rapidly and/or repeatedly transitioning back and forth between QoS levels over a short period of time. If the available data falls below a first threshold, the QoS level may be increased. If the available data rises above a second threshold (that is higher than the first threshold), the QoS level may be decreased. Together the thresholds that define the transitions between the QoS levels may be referred to as a set of thresholds.

The display pipe 16 may further support multiple sets of thresholds. One set may be programmed to the "conservative" settings, based on worst-case scenarios for busyness in the SoC 10 and particularly the memory controller 22. Other sets may be programmed to more aggressive settings, and may be used at times that are less busy. In one embodiment, two sets of thresholds may be supported, and selection may be based on a busy/not busy decision. Other embodiments may implement more than two sets and selection may be more granular. The more aggressive set may generally be lower thresholds than the corresponding thresholds in the conservative set. Because the worst-case scenarios may occur infrequently, the more aggressive sets may be used and the incidence of higher QoS requests may be reduced, in some embodiments.

To select between the sets of thresholds, the display pipe 16 may be configured to receive and/or measure memory controller busyness (or stress), directly or indirectly. The most direct indication may be an indication from the memory controller 22 itself (e.g. the MC_Stress indication in FIG. 1). The MC_Stress indication may be a signal that may be asserted by the memory controller 22 to indicate stress and deasserted to indicate no stress, in an embodiment. In another embodiment, the MC_Stress indication may indicate levels of stress, and each level may be used to select a different set of thresholds in the display pipe 16. The memory controller 22 may be configured to determine it's stress level in a variety of fashions. For example, buffer fullness in the memory controller, memory bandwidth usage, non-display pipe memory operation counts, memory operation latency, etc. may be examples of factors that may be used by the memory controller 22 to determine its stress level. Generally, a memory stress level may be an indication of the memory controller's ability to service memory operations. The memory stress level may be correlated to the busyness of the memory controller, and may in some embodiments be a measure of busyness.

In other embodiments, the memory stress may be inferred from other measurements. For example, the ISP 24 may be another real time device in the system, and thus may compete with the display pipe 16 for priority access to the memory 12. If the ISP is powered off, then the display pipe 16 has less competition and a lower memory stress level may be inferred. If the ISP is powered on (and thus operational), a higher level of stress may be inferred. The PMGR 32 may be configured to provide the ISP_On indication if this embodiment is used. Alternatively, the ISP 24 may provide the ISP_On indication. In other embodiments, there may be other real time devices in the SoC 10 in addition to or instead of the ISP 24. The PMGR 32 and/or the real time devices themselves may provide indications of on or off. In still other embodiments, the real time devices (including the ISP 24) may provide levels of activity to indicate how much stress the memory controller 22 may be under.

In some embodiments, the display pipe 16 may be configured to infer memory stress from internal measurements. For example, the display pipe 16 may track the latency of read operations issued by the display pipe 16. An increase in memory latency may indicate increased stress in the memory controller 22. Additionally, input buffer occupancy may be inversely proportional to memory controller stress. That is, more data available in the input buffer(s) may indicate less memory stress, since data is being provided rapidly to the display pipe 16 as compared to the consumption of data in the display pipe 16.

In one embodiment, three QoS levels may be supported (green, yellow, and red, with increasing levels of priority over other operations). Thus, a set of thresholds may be two thresholds (or four thresholds with hysteresis). Other embodiments may support two levels or more than three levels. The green level may be the initial level, and may generally be considered as similar in priority to operations from other sources. The yellow level may be a higher level. Operations marked yellow may be performed first by the memory controller 22 (ahead of other operations), but may be grouped with other operations that are not yellow. The red level may be the highest level. Red operations may be performed first and may be performed even if other operations could be grouped together and performed more efficiently by the memory controller 22 before the red operations.

Each other device on the communication fabric 27 may provide QoS parameters for memory operations as well. Other real time devices, e.g. the ISP 24, may use a set of QoS levels similar to the ones described above for the display pipe 16. Non-real time devices, such as the processors 28 or various peripherals 18A-18B may also used a similar set of QoS levels and may be limited to the lowest priority level or levels. Alternatively, the non-real time devices may use a different set of QoS levels. In one embodiment, the non-real time devices may use a best effort level and a low latency level. The best effort level may be a low priority level, and the low latency level may sometimes be considered higher priority but may be treated as low priority if the memory controller 22 begins receiving too many yellow or red QoS levels from the display pipe 16 and/or the ISP 24.

The display pipe 16 may be configured to perform any type of processing on the image data (static frames, video sequences, etc.). In one embodiment, the display pipe 16 may be configured to scale static frames and to dither, scale, and/or perform color space conversion on the frames of a video sequence. The display pipe 16 may be configured to blend the static frames and the video sequence frames to produce output frames for display. The display pipe 16 may also be more generally referred to as a display control unit. A display control unit may generally be any hardware configured to prepare a frame for display (from one or more sources, such as static frames and/or video sequences).

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SoC 10 (e.g. a smart phone or tablet) and/or may be a separately housed device such as a computer monitor, television, or other device.

The ISP 24 may be configured to receive image sensor data from the image sensors 26 and may be configured to process the data to produce image frames that may be suitable, e.g., for display on a display 20. The image sensors 26 may include cameras (e.g. charge coupled devices (CCDs), complementary metal-oxide-semiconductor (CMOS) sensors, etc.).

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or and interface to the other components of the system (e.g. an interface to the communication fabric 27).

The peripherals 18A-18B may be any set of additional hardware functionality included in the SOC 10. For example, the peripherals 18A-18B may include video peripherals such as video encoder/decoders, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory operations from the other components of the SOC 10 and for accessing the memory 12 to complete the memory operations. As mentioned above, the memory requests may include QoS parameters specifying QoS levels, and the memory controller 22 may sequence operations from the various devices based at least in part of the QoS parameters. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.).

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the power up and power down of other components of the SOC 10. That is, the PMGR 32 may cause other components to power up and power down. The PMGR 32 may be under direct software control (e.g. software may directly request the power up and/or power down of components) and/or may be configured to monitor the SOC 10 and determine when various components are to be powered up or powered down. The PMGR 32 may also be configured to transition components between different power states (e.g. voltage/frequency combinations). The PMGR 32 may further be configured to request various voltage magnitudes for components in the SOC 10 from an external power controller.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
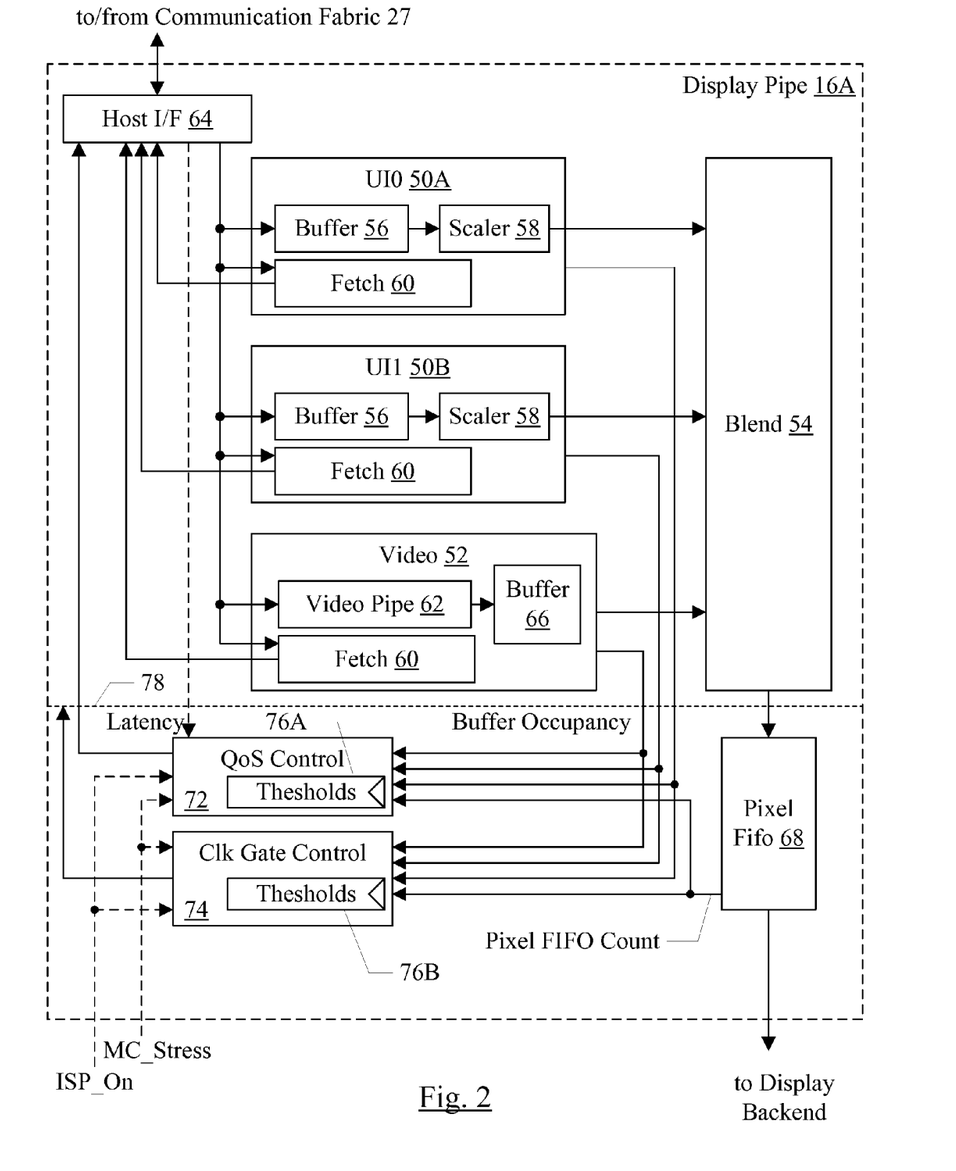
FIG. 2 is a block diagram of one embodiment of a display pipe shown in FIG. 1.

Turning now to FIG. 2, a block diagram of one embodiment of a portion of the display pipe 16A is shown. There may be additional circuitry (e.g. the display backend referenced in FIG. 2) to directly interface to the display 20 to display pixels generated by the display pipe 16A. There may be multiple instances of the display pipe 16 for coupling to multiple displays 20. As shown in FIG. 2, the display pipe 16A may include one or more user interface (UI) units, two shown as UI0 50A and UI0 50B in this case. One or more video units such as video unit 52 may also be included, along with a blend unit 54. A host interface unit (host I/F) 64 may also be included. An output pixel buffer 68 (or a pixel first-in, first-out buffer (FIFO)) is shown. A QoS control circuit 72 and a clock gate control circuit 74 are also shown. Each of the QoS control circuit 72 and the clock gate control circuit 74 may include respective threshold registers 76A-76B.

In the illustrated embodiment, the host interface unit 64 may be coupled to the user interface units 50A-50B, the video unit 52, and the QoS control circuit 72. The user interface units 50A-50B and the video unit 52 may further be coupled to the blend unit 54. The blend unit 54 may be coupled to the pixel FIFO 68. The QoS control circuit 72 and the clock gate control circuit 74 may be coupled to receive buffer occupancy indications from the user interface units 50A-50B and the video unit 52, and to receive MC_Stress and ISP_On indications in embodiments that implement those indications. The clock gate control circuit 74 may be configured to control clock gating in a portion of the display pipe 16A. Particularly, the portion above the dashed line 78 in FIG. 2 may be able to be clock gated. The QoS control circuit 72 and the clock gate control circuit 74 may be coupled to receive a pixel FIFO count from the pixel FIFO 68.

The pixel FIFO 68 may be the interface to the display backend, which may control the display 20 to display the pixels generated by the display pipe 16A. The display backend may read pixels at a regular rate from the pixel FIFO 68 according to a pixel clock. The rate may depend on the resolution of the display as well as the refresh rate of the display. For example, a display having a resolution of N×M and a refresh rate of R frames per second may have a pixel clock frequency based on N×M×R. On the other hand, the pixel FIFO 68 may be written by the blend unit 54 as pixels are generated by the blend unit 54. In some instances, the rate at which the display pipe 16A generates pixels may be faster than the rate at which the pixels are read, assuming that data is provided to the display pipe 16A from the memory 12 quickly enough.

The pixels in the pixel FIFO 68 may thus be a measure of a margin of safety for the display pipe 16A before erroneous operation may be observed on the display 20. The QoS control circuit 72 may be configured to generate QoS levels based on the number of pixels in the pixel FIFO 68, e.g. as compared to one or more thresholds programmed into the thresholds register 76A. The clock gate control circuit 74 may similarly determine when to clock gate the display pipe 16A based on a threshold.

Additionally, in some embodiments, the amount of data that is available within the display pipe 16A to generate additional pixels for the pixel FIFO 68 may be viewed as additional margin of safety. Accordingly, the amount of data in the output buffers may also be measured against a threshold or thresholds, if desired, to determine the QoS level and/or clock gating. Alternatively, the data buffer occupancy indications may be used as memory stress indicators to select among sets of thresholds.

The QoS control circuit 72 may receive the pixel FIFO count and may be configured to compare the pixel FIFO count to a selected set of thresholds. The selected set is selected from two or more sets programmed into the threshold register 76A. There may be a threshold for each level (except for the green level, since that is the normal level if all of the thresholds have been exceeded). Since emptying the pixel FIFO 68 is the event to be avoided, the lowest threshold that the pixel FIFO count drops below may be the threshold that determines which QoS level to request. Thus, an embodiment that implements the green, yellow, and red QoS levels discussed above may include a red threshold and a yellow threshold. The red threshold may be the lowest threshold. If the pixel FIFO count is less than the red threshold, the QoS control circuit 72 may generate the red QoS level. If the pixel FIFO count is greater than the red threshold but less than the yellow threshold, the QoS control circuit 72 may generate the yellow QoS level. If the pixel FIFO count is greater than the yellow threshold, the QoS control circuit 72 may generate the green QoS level. The QoS control circuit 72 may provide the generated level to the host interface unit 64, which may transmit the QoS level with each memory read operation to the memory controller 22. In one embodiment, the QoS control circuit 72 may implement on and off thresholds to permit hysteresis in the changing between levels. In such embodiments, the current QoS level may be included in determining the QoS level for a request, in addition to the thresholds. Other embodiments may not implement hysteresis and may have one threshold level per QoS level. It is noted that embodiments which support hysteresis may be programmed to operate without hysteresis by setting the on and off thresholds to the same value.

The clock gate control circuit 74 may similarly determine if clock gating may be performed based on one or more sets of thresholds in the thresholds register 76B. In one embodiment, there may be a threshold to enable clock gating and another threshold to awaken from clock gating. The enable threshold and awaken threshold may be compared to the pixel FIFO count, similar to the discussion above with regard to the QoS control circuit 72. Based on the comparisons, the clock gate control circuit 74 may generate one or more clock gate control signals which may be distributed to clock gaters in the section of the display pipe 16A above the dashed line 78 in FIG. 2. Similar to the above discussion, the on and off thresholds may be programmed to the same value if desired.

Each user interface unit 50A-50B may include instances of a buffer 56, a scaler 58, and a fetch unit 60. The buffer 56 may be coupled to receive image data from the host interface unit 64 and to provide the data to the scaler 58. The scaler 58 may be configured to output pixels to the blend unit 54 with an alpha value for blending. The fetch unit 60 may be coupled to provide memory operations to the host interface unit 64 for transmission to the memory controller 22. The video unit 52 may include a video pipe 62, a video output buffer 66, and one or more fetch units 60. For example, the video unit 52 may include a fetch unit 60 for each image plane in the video sequence. The various image planes may describe the video image. For example, the image planes may be color planes (e.g. red, green, blue or Y, Cr, Cb). The fetch unit(s) 60 in the video unit 52 may be coupled to provide memory operations to the host interface unit 64. The video pipe 62 may be coupled to receive video image data from the host interface unit 64.

The buffers 56 may be input line buffers. That is, the buffers 56 may store lines of data corresponding to lines of the input frame. For vertical downscaling, data from adjacent lines of the input frame may be needed to generate each output pixel, and thus the line buffers may provide space to store data for processing. The data may be the color data for each pixel, as well as an alpha value for blending.

The buffer 66 may be an output buffer of video frame pixels. The pixels in the buffer 66 may already have been scaled, if applicable, and may be ready for blend to produce output pixels for the output pixel FIFO 68.

Generally, the image data input to each of the units 50A-50B and 52 may describe the source image to be displayed. In an embodiment, the image data for a user interface image input to the units 50A and 50B may include pixel data and an alpha value for blending. The pixel data may describe a color for each pixel. The scaled pixels may be provided as output pixels from the user interface units 50A and 50B to the blend unit 54, along with the alpha values. In an embodiment, the user interface units 50A-50B may support programmable active regions in the source image. The active regions may define the only portions of the source image to be displayed. In an embodiment, the user interface units 50A-50B may be configured to only fetch data within the active regions. Outside of the active regions, dummy data with an alpha value of zero may be passed as the pixel data.

In one embodiment, the video pipe 62 may receive fetched image data describing a sequence of frames to be displayed at a frame rate specified for the video sequence. In an embodiment, the video sequence data may be in YCbCr format, and the video unit 62 may be configured to color space cover the frames to RGB for blend with the frames from the user interface units 50A-50B. The video pipe 62 may insert random noise (dither) into the data and may optionally scale the data in one or both of vertical and horizontal directions.

The blend unit 54 may receive frames of pixels from the user interface units 50A-50B and the video unit 52, and may be configured to blend them together layer by layer. The final resultant pixels may be queued in the output pixel FIFO 68. The lowest level layer in the blend unit 54 may be defined as the background color. Layer 1 may blend with layer 0. The next layer, layer 2, may blend with the blended layers 0 and 1, and so on until all the layers are blended.

Each of the units 50A-50B and 52 may include pipelined hardware that performs the operations assigned to that unit. Accordingly, each of the units 50A-50B and 52 may be referred to as a pipe. Thus, the user interface units 50A-50B may be user interface pipes or static frame/image pipes. The video unit 52 may be referred to as a video pipe or video sequence pipe.

Figure 3:
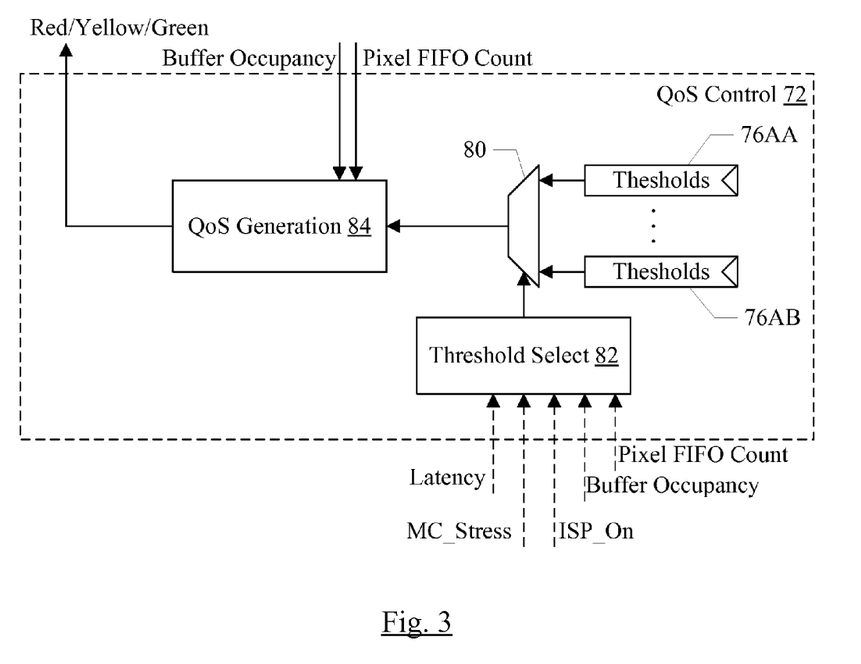
FIG. 3 is a block diagram of one embodiment of a QoS control unit shown in FIG. 2.

Turning now to FIG. 3, a block diagram of one embodiment of the QoS control circuit 72 is shown in greater detail. In the illustrated embodiment, the QoS control unit 72 includes thresholds register 76AA configured to store a first set of thresholds and thresholds register 76AB configured to store a second set of thresholds. Other registers may store other sets of thresholds in some embodiments, indicated by the ellipses between the registers 76AA and 76AB. Together, these registers may be an embodiment of the threshold registers 76A in FIG. 2. The thresholds registers 76AA-76AB are coupled to multiplexor (mux) 80, which has a selection control coupled to the threshold select circuit 82. The threshold select unit 82 is coupled to receive various measures of memory stress (e.g. the MC_Stress indication, the ISP_On indication, the latency of read operations from the display pipe 16, the buffer occupancy indications, and/or the pixel FIFO count). The output of the mux 80 is coupled to the QoS generation circuit 84, which is coupled to receive the pixel FIFO count and/or the buffer occupancy indications. The QoS generation circuit 84 is configured to generate the QoS level (e.g. red, green, or blue) and to provide the QoS level to the host I/F 64 in FIG. 2.

More particularly, the threshold select circuit 82 may be configured to evaluate one or more indications of memory stress, and to select a thresholds register 76AA-76AB responsive to the evaluation. The threshold select circuit 82 may be configured to select one register (e.g. the register 76AA) if high memory stress is detected, and another register (e.g. the register 76AB) if low memory stress is selected. Software may thus program the registers 76AA-76AB with appropriate sets of thresholds for each case. For example, the register 76AA may be programmed with a conservative set of thresholds corresponding to a worst-case analysis to prevent underrun, while register 76AB may be programmed with a more aggressive set of thresholds.

The output of the mux 80 may thus be a current set of thresholds to be compared to the data available in the display pipe 16 to determine the QoS level for subsequent read operations. The QoS generation circuit 84 may receive the set of thresholds, and may compare one or both of the buffer occupancy indications and the pixel FIFO count to the set of thresholds to determine the QoS level. In this embodiment, the QoS generation circuit 84 may not retain state corresponding to the selected set of thresholds, and thus the mux 80 may select different outputs on different clock cycles without synchronizing with the QoS generation circuit 84. Other embodiments may employ synchronization/handshaking to modify the set of thresholds. Thus, in general, the QoS control circuit 72 may be configured to dynamically modify or update the set of thresholds used to determine the QoS levels.

In an embodiment, the QoS generation unit 84 may combine the buffer occupancy (or an equivalent number of pixels in the buffer) with the pixel FIFO count for comparison to the thresholds. In another embodiment, separate thresholds may be compared to the pixel FIFO count and the buffer occupancy. In still another embodiment, the combined values may be compared in a low memory stress case and only the pixel FIFO count may be compared in a high memory stress case.

Figure 4:
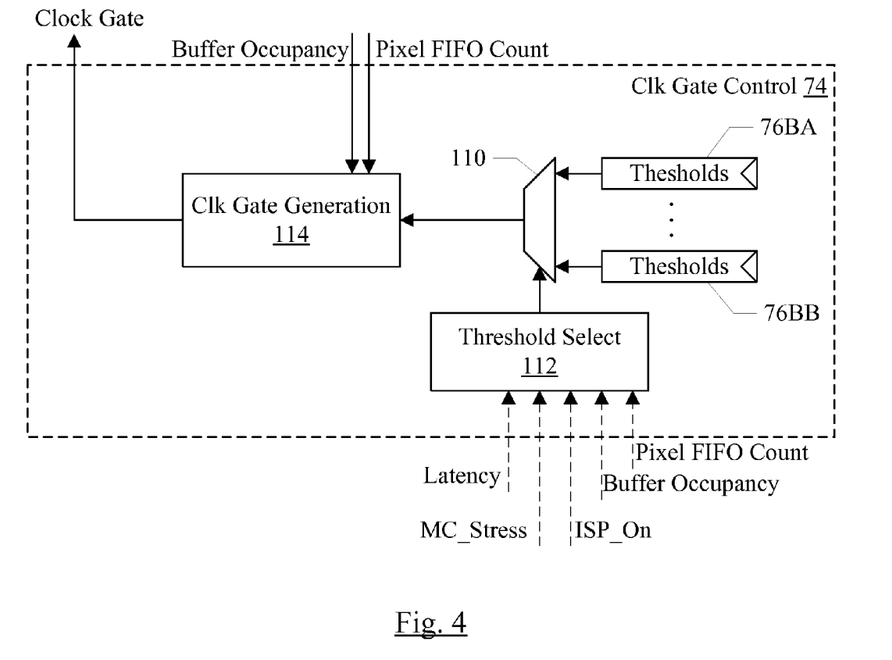
FIG. 4 is a block diagram of one embodiment of a clock gate control unit shown in FIG. 2.

FIG. 4 is a block diagram of one embodiment of the clock gate control circuit 74 shown in greater detail. In the illustrated embodiment, the clock gate control circuit 74 includes thresholds register 76BA configured to store a first set of thresholds and thresholds register 76BB configured to store a second set of thresholds. Other registers may store other sets of thresholds in some embodiments, indicated by the ellipses between the registers 76BA and 76BB. Together, these registers may be an embodiment of the threshold registers 76B in FIG. 2. The thresholds registers 76BA-76BB are coupled to mux 110, which has a selection control coupled to the threshold select circuit 112. The threshold select unit 112 is coupled to receive various measures of memory stress (e.g. the MC_Stress indication, the ISP_On indication, the latency of read operations from the display pipe 16, the buffer occupancy indications, and/or the pixel FIFO count). The output of the mux 110 is coupled to the clock gate generation circuit 114, which is coupled to receive the pixel FIFO count and/or the buffer occupancy indications. The clock gate generation circuit 114 is configured to generate the clock gate for the section 78 of the display pipe 16A.

Similar to the threshold select circuit 82, the threshold select circuit 112 may be configured to evaluate one or more indications of memory stress, and to select a thresholds register 76BA-76BB responsive to the evaluation. The memory stress indications considered, and the specific mechanism to identify the memory stress level, need not be exactly the same as the threshold select circuit 82, but may generally be similar. The clock gate generation circuit 114, similar to the QoS generation circuit 84, may compare the current set of thresholds output from the mux 110 to determine whether or not to clock gate.

Figure 5:
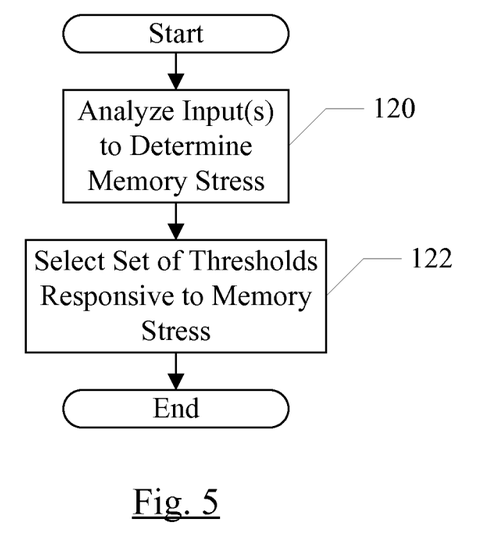
FIG. 5 is flowchart illustrating operation of one embodiment of a threshold select unit shown in FIGS. 3 and 4.

FIG. 5 is a flowchart illustrating operation of one embodiment of the threshold select circuit 82/112. While the blocks are shown in a particular order for ease of understanding, other orders may be used. Blocks may be performed in parallel in combinatorial logic within the circuit 82/112. Blocks, combinations of blocks, and/or the flowchart as a whole may be pipelined over multiple clock cycles. The circuit 82/112 may be configured to implement the operation shown in FIG. 5. The circuit 82/112 may be configured to analyze various input memory stress level indications (block 120) to determine a current memory stress level, and may select a set of thresholds via the mux 80/110 responsive to the current memory stress level (block 122)

Figure 6:
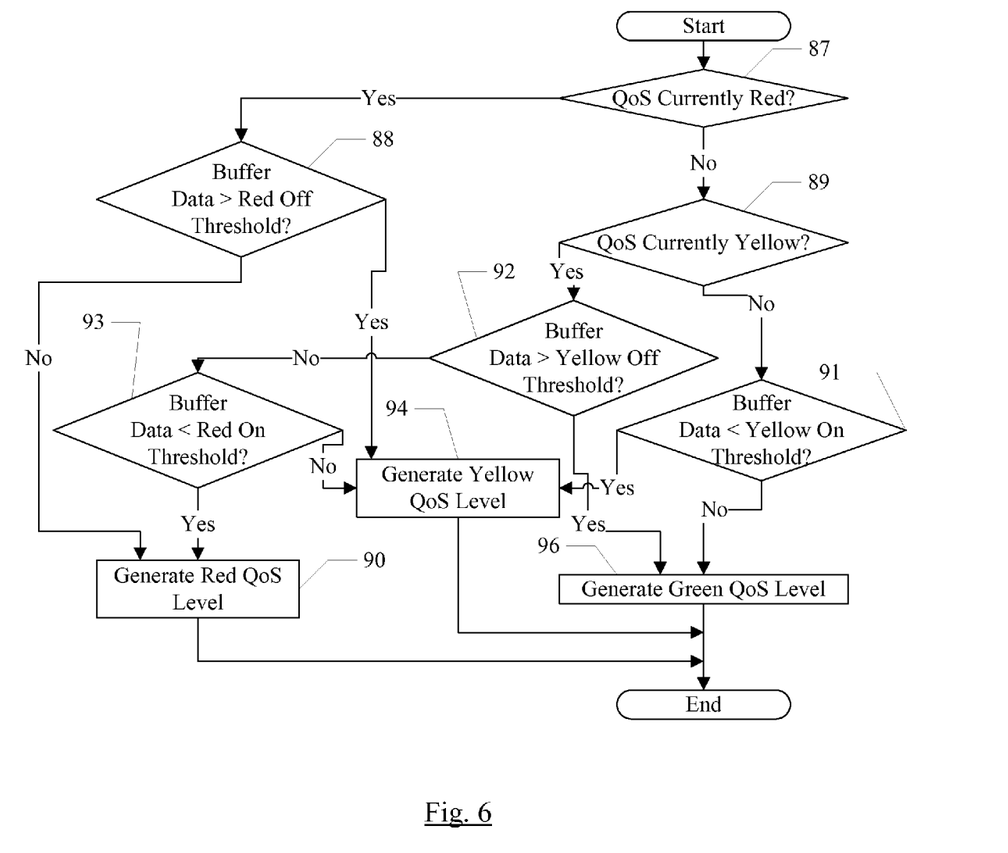
FIG. 6 is a flowchart illustrating operation of portions of one embodiment of the display pipe shown in FIG. 1 for QoS level assignment.

Turning next to FIG. 6, a flowchart is shown illustrating operation of one embodiment of the QoS generation circuit 84. While the blocks are shown in a particular order for ease of understanding, other orders may be used. Blocks may be performed in parallel in combinatorial logic in the QoS generation circuit 84. Blocks, combinations of blocks, and/or the flowchart as a whole may be pipelined over multiple clock cycles. The QoS generation circuit 84 may be configured to implement the operation shown in FIG. 6.

Because the embodiment illustrate in FIG. 6 implements hysteresis, the current QoS level (or the most recently determined QoS level) is a factor in the determination of the QoS level by the QoS generation circuit 84. Embodiments that do not implement hysteresis may determine QoS level based only on the threshold levels, and there may be only one threshold level per QoS level. If the QoS level is currently red (decision block 87, "yes" leg), then the QoS level may remain red until the buffer data (e.g. the pixel FIFO count and/or the buffer occupancy indications) rises above the red off threshold. If the amount of buffer data is greater than the red off threshold (decision block 88, "yes" leg), the QoS generation circuit 84 may generate a yellow QoS level (block 94). If the amount of buffer data is less than the red off threshold (decision block 88, "no" leg), the QoS generation circuit 84 may generate a red QoS level (block 90). If the QoS level is not currently red (decision block 87, "no" leg) but is currently yellow (decision block 89, "yes" leg) and the amount of buffer data is greater than the yellow off threshold (decision block 92, "yes" leg), the QoS generation circuit 84 may generate the green QoS level (block 96). If the QoS level is not currently red (decision block 87, "no" leg) but is currently yellow (decision block 89, "yes" leg), the amount of buffer data is not greater than the yellow off threshold (decision block 92, "no" leg), and the amount of buffer data is less than the red on threshold (decision block 93, "yes" leg), the QoS generation circuit 84 may generate the red QoS level (block 90). If the QoS level is not currently red (decision block 87, "no" leg) but is currently yellow (decision block 89, "yes" leg), the amount of buffer data is not greater than the yellow off threshold (decision block 92, "no" leg), and the amount of buffer data is greater than the red on threshold (decision block 93, "no" leg), the QoS generation circuit 84 may generate the yellow QoS level (block 94). If the QoS level is not currently red (decision block 87, "no" leg) but is currently yellow (decision block 89, "yes" leg) and the amount of buffer data is greater than the yellow off threshold (decision block 92, "yes" leg), the QoS generation circuit 84 may generate the green QoS level (block 96). If the current QoS level is neither red nor yellow (i.e. it is green, decision blocks 87 and 89, "no" legs), and the amount of buffer data is less than the yellow on threshold (decision block 91, "yes" leg), the QoS generation circuit 84 may generate a yellow QoS level (block 94). Finally, if the QoS level is currently green (decision blocks 87 and 89, "no" legs), and the amount of buffer data is greater than the yellow on threshold (decision block 91, "no" leg), the QoS generation circuit 84 may generate a green QoS level (block 96).

Figure 7:
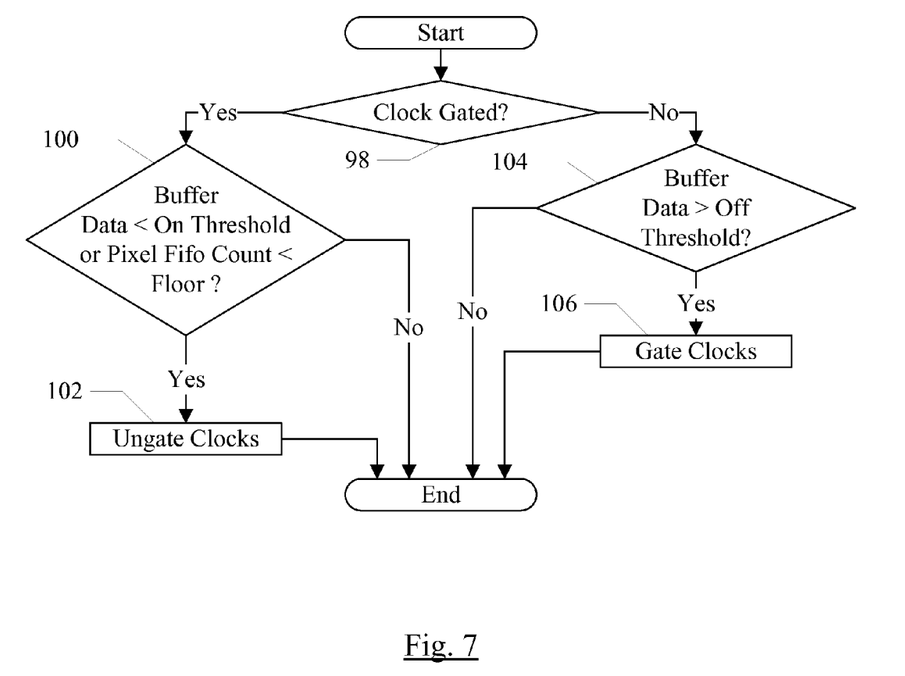
FIG. 7 is a flowchart illustrating operation of portions of one embodiment of the display pipe shown in FIG. 1 for clock gating.

Turning next to FIG. 7, a flowchart is shown illustrating operation of one embodiment of the clock gate generation circuit 114. While the blocks are shown in a particular order for ease of understanding, other orders may be used. Blocks may be performed in parallel in combinatorial logic in the clock gate generation circuit 114. Blocks, combinations of blocks, and/or the flowchart as a whole may be pipelined over multiple clock cycles. The clock gate generation circuit 114 may be configured to implement the operation shown in FIG. 7.

If a portion of the display pipe 16A is currently clock gated (decision block 98, "yes" leg), the clock gate generation circuit 114 may determine if the amount of buffer data is less than the on (or awaken) threshold (decision block 100). If so (decision block 100, "yes" leg), the clock gate generation circuit 114 may generate clock gate controls to ungate the clocks (block 102). Additionally, in this embodiment, a floor based only on the pixel FIFO count may be supported (and may be programmed into the threshold registers 76B). If the pixel FIFO count is less than the floor (decision block 100, "yes" leg), the clock gate generation circuit 114 may generate clock gate controls to ungate the clocks (block 102). If the amount of buffer data is greater than the on threshold and the pixel FIFO count is greater than the floor (decision block 100, "no" leg), clocks may remain gated. On the other hand, if the portion of the display pipe 16A is not currently clock gated (decision block 98, "no" leg), the clock gate generation circuit 114 may determine if the amount of buffer data is greater than the off threshold (decision block 104). If so (decision block 104, "yes" leg), the clock gate generation circuit 114 may generate clock gate controls to gate the clocks (block 106). If not (decision block 104, "no" leg), clocks may remain ungated.

Figure 8:
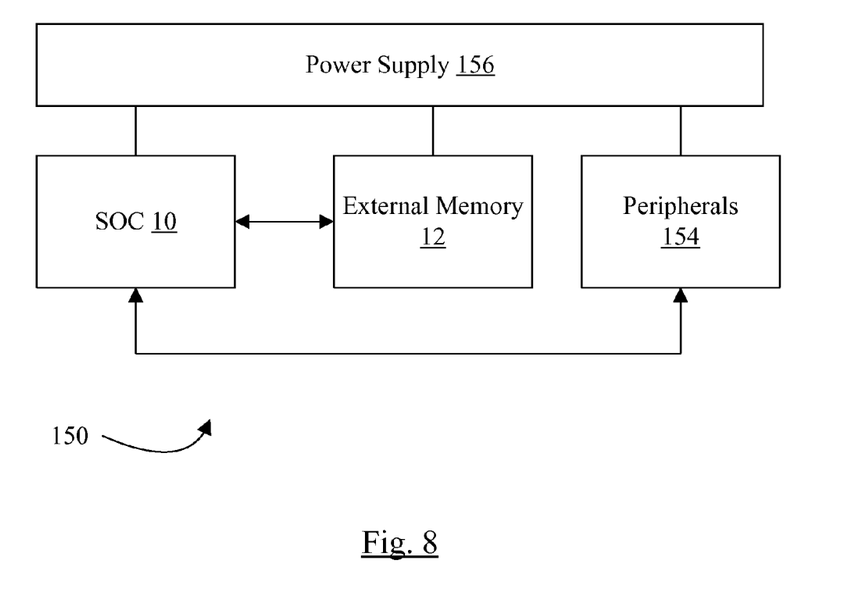
FIG. 8 is a block diagram of one embodiment of a system including the SoC shown in FIG. 1.

Turning next to FIG. 8, a block diagram of one embodiment of a system 150 is shown. In the illustrated embodiment, the system 150 includes at least one instance of the SOC 10 coupled to one or more peripherals 154 and the external memory 12. A power supply 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. The displays 20 and/or image sensors 26 may be peripherals 154, in some embodiments. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A method comprising:
analyzing one or more inputs that are indicative of a level of activity in a memory controller to determine a level of memory stress, the analyzing performed in a display control unit configured to process image data into an output frame for display;
selecting a set of thresholds from a plurality of sets of thresholds to be compared to an amount of image data in the display control unit responsive to the determined level of memory stress, the selecting performed in the display control unit;
comparing the selected set of thresholds to the amount of image data, the comparing performed in the display control unit; and
determining a quality of service (QoS) level, in the display control unit, for image data reads to the memory controller responsive to the comparing.

2. The method as recited in claim 1 further comprising programming the plurality of sets of thresholds into the display control unit.

3. The method as recited in claim 1 wherein a first set of the plurality of thresholds that corresponds to a lower memory stress level permit less data in the amount of image data prior to increasing the QoS level than corresponding thresholds permit in a second set of the plurality of thresholds that corresponds to a higher memory stress level.

4. The method as recited in claim 1 wherein the amount of image data compared to the selected set of thresholds comprises an amount of data stored in buffers in the display control unit.

5. The method as recited in claim 1 wherein the amount of image data compared to the selected set of thresholds comprises an amount of data stored in an output buffer ready for display.

6. The method as recited in claim 1 further comprising:
selecting a second one or more thresholds from a plurality of second thresholds to be compared to an amount of image data in the display control unit responsive to the determined level of memory stress, the selecting performed in the display control unit;
comparing the selected second one or more thresholds to the amount of image data, the comparing performed in the display control unit; and
determining whether or not to clock gate, in the display control unit, responsive to comparing the selected second one or more thresholds to the amount of image data.

7. The method as recited in claim 1 wherein the one or more inputs comprise an indication that one or more real time devices are active in a system including the display control unit and the memory controller.

8. The method as recited in claim 1 wherein the one or more inputs comprise a memory latency experienced for read requests from the display control unit.

9. A display control unit comprising:
one or more pipelines configured to process image data for display on a display device to which the display control unit is coupled;
a host interface unit coupled to the one or more pipelines and configured to transmit read operations to a memory controller to read image data for the one or more pipelines, wherein the host interface unit is configured to assign a quality of service (QoS) level to each read operation; and
a QoS control unit coupled to the host interface unit and configured to indicate the QoS level to assign to subsequent read operations issued by the host interface unit, wherein the QoS control unit is configured to determine the QoS level responsive to an amount of data in the display control unit as compared to one or more thresholds, and wherein the QoS control unit is configured to dynamically adjust the one or more thresholds responsive to a determination of a level of activity in a memory controller that processes the read memory operations from the display control unit.

10. The display control unit as recited in claim 9 wherein the determination of the level of activity is communicated by the memory controller to the display control unit.

11. The display control unit as recited in claim 9 wherein the determination of the level of activity is performed in the display control unit responsive to a latency experienced by the read memory operations.

12. The display control unit as recited in claim 9 wherein the one or more pipelines include buffers of data, wherein the amount of data in the display control unit that is compared to the one or more thresholds includes an amount of data in the buffers.

13. The display control unit as recited in claim 12 wherein the buffers include an input buffer to the one or more pipelines.

14. The display control unit as recited in claim 13 wherein the buffers include an output buffer from the one or more pipelines.

15. The display control unit as recited in claim 14 further comprising a blend unit coupled to outputs of the one or more pipelines and configured to blend data from the one or more pipelines to generate output pixels for display, wherein the blend unit is configured to update a second output buffer with the output pixels, and wherein the buffers include the second output buffer.

16. A system comprising:
a memory controller configured to couple to a memory; and
a display control unit coupled to the memory controller and configured to transmit read operations to the memory controller to read image data for display, wherein the display control unit is configured to assign a quality of service (QoS) parameter to each read operation responsive to an amount of image data in the display control unit as compared to at least one threshold, and wherein the display control unit is configured to modify the at least one threshold among a plurality of thresholds responsive to an amount of activity in the memory controller.

17. The system as recited in claim 16 further comprising an image signal processor configured to write data to the memory controller, and wherein the amount of activity in the memory controller indicated to the display control unit includes a signal indicated that the image signal processor is on.

18. The system as recited in claim 17 further comprising a power manager coupled to the display control unit, wherein the power manager is configured to generate the signal.

19. The system as recited in claim 16 wherein the memory controller is configured to transmit one or more indications of the amount of activity in the memory controller.

20. The system as recited in claim 16 wherein the display control unit is configured to estimate the amount of activity in the memory controller.

* * * * *